(12) United States Patent
Odaira

(10) Patent No.: US 8,200,750 B2
(45) Date of Patent: Jun. 12, 2012

(54) DATA COMMUNICATION APPARATUS, CONTROL METHOD THEREOF, COMPUTER PROGRAM AND STORAGE MEDIUM

(75) Inventor: Masahiro Odaira, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 576 days.

(21) Appl. No.: 12/173,917

(22) Filed: Jul. 16, 2008

(65) Prior Publication Data

US 2009/0055470 A1 Feb. 26, 2009

(30) Foreign Application Priority Data

Aug. 20, 2007 (JP) ................................. 2007-214045

(51) Int. Cl.
*G06F 15/16* (2006.01)
(52) U.S. Cl. .................... 709/203; 709/205; 709/206
(58) Field of Classification Search .................. 709/203
See application file for complete search history.

(56) References Cited

U.S. PATENT DOCUMENTS

| | | | | |
|---|---|---|---|---|
| 7,028,312 | B1* | 4/2006 | Merrick et al. | 719/330 |
| 7,599,080 | B2* | 10/2009 | Kawamura | 358/1.13 |
| 2002/0040400 | A1* | 4/2002 | Masters | 709/228 |
| 2002/0120727 | A1* | 8/2002 | Curley et al. | 709/223 |
| 2003/0097010 | A1* | 5/2003 | Vogel et al. | 552/208 |
| 2003/0177241 | A1* | 9/2003 | Katayama | 709/226 |
| 2005/0141013 | A1* | 6/2005 | Kikuchi et al. | 358/1.14 |
| 2006/0170946 | A1* | 8/2006 | Kawamura | 358/1.13 |
| 2007/0086065 | A1 | 4/2007 | Wada | 358/402 |
| 2007/0171467 | A1* | 7/2007 | Mokuya et al. | 358/1.15 |
| 2007/0185974 | A1* | 8/2007 | Kawasaki | 709/217 |
| 2007/0258465 | A1* | 11/2007 | Ma et al. | 370/395.53 |
| 2009/0313345 | A1* | 12/2009 | Dollar et al. | 709/206 |

FOREIGN PATENT DOCUMENTS

| | | |
|---|---|---|
| CN | 1984212 A | 6/2007 |
| JP | 8-23409 A | 1/1996 |
| JP | 2003-101685 A | 4/2003 |
| JP | 2003-283734 A | 10/2003 |
| JP | 3612961 B2 | 1/2005 |
| JP | 2005-101796 A | 4/2005 |
| JP | 2007-174280 A | 7/2007 |
| WO | WO 2006/004219 | 1/2006 |
| WO | WO 2006/006549 | 1/2006 |

\* cited by examiner

*Primary Examiner* — Thuong (Tina) Nguyen
*Assistant Examiner* — Arvin Eskandarnia
(74) *Attorney, Agent, or Firm* — Fitzpatrick, Cella, Harper & Scinto

(57) ABSTRACT

A data communication apparatus that reduces erroneous transmission, together with allowing an operator to confirm destinations registered as data transmission destinations. To accomplish this, the data communication apparatus includes a destination registering unit adapted to register at least one or more destinations, a data acquisition unit adapted to acquire data to transmit to the registered destinations, a destination list print unit adapted to print a destination list showing the registered destinations to allow an operator to confirm the registered destinations, an operation acquisition unit adapted to acquire, via an operation unit, a first operation operated by the operator if the destinations shown on the destination list are confirmed by the operator, and a transmission unit adapted to transmit, if the first operation is acquired, the acquired data to the destinations shown on the destination list.

10 Claims, 16 Drawing Sheets

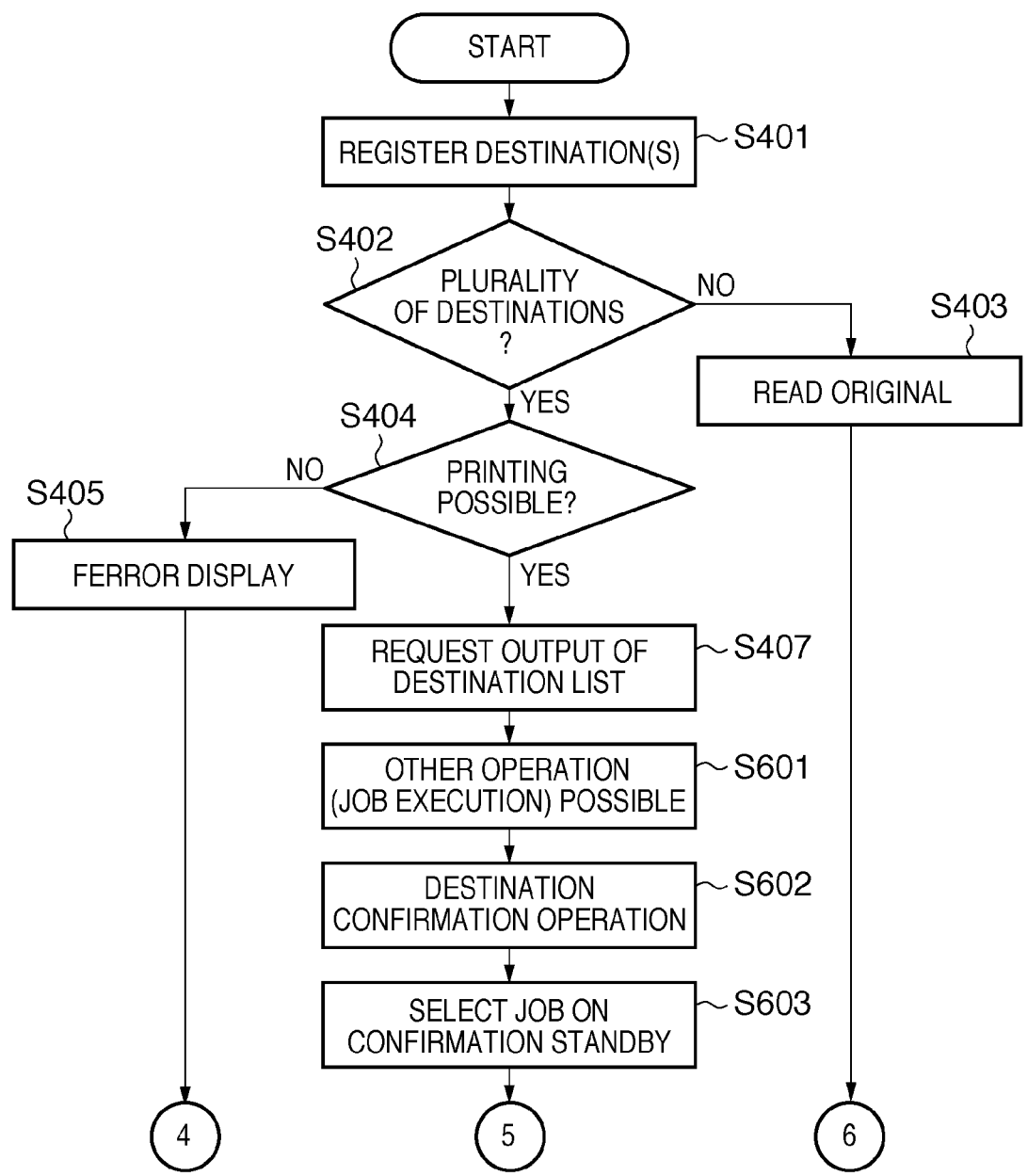

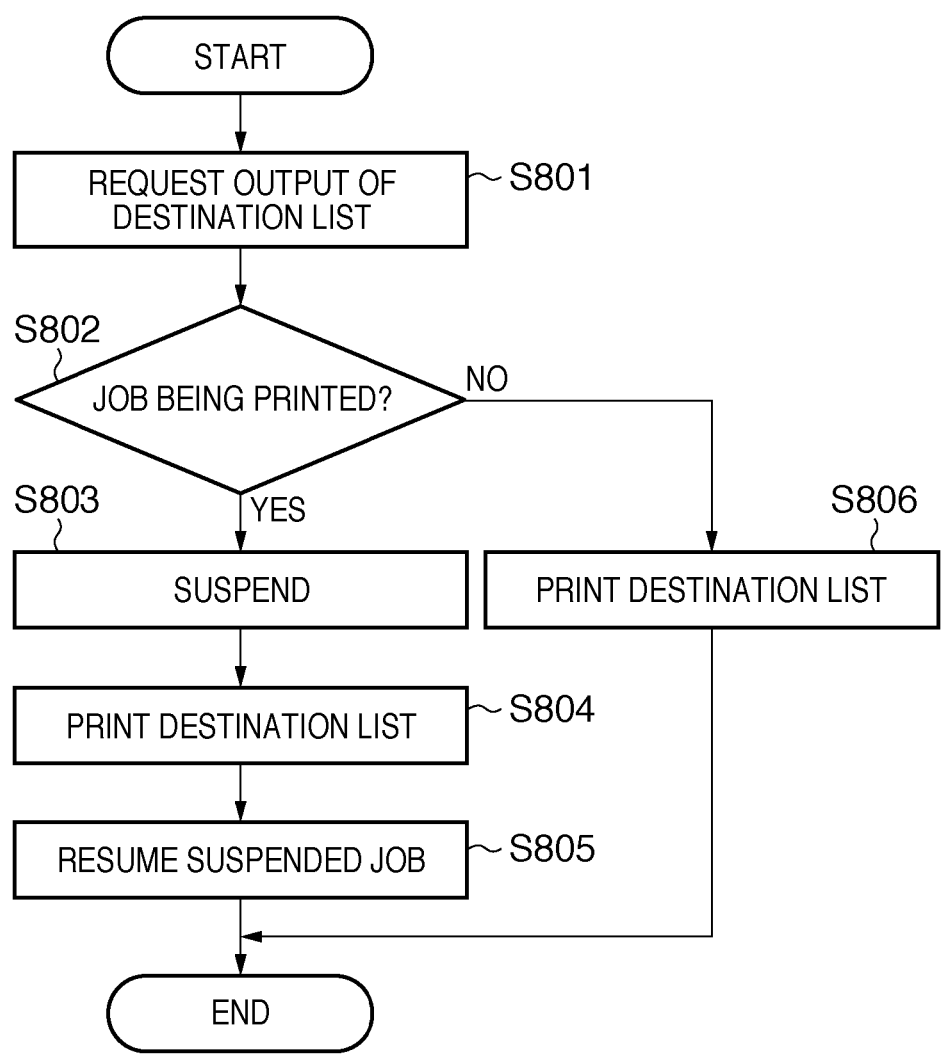

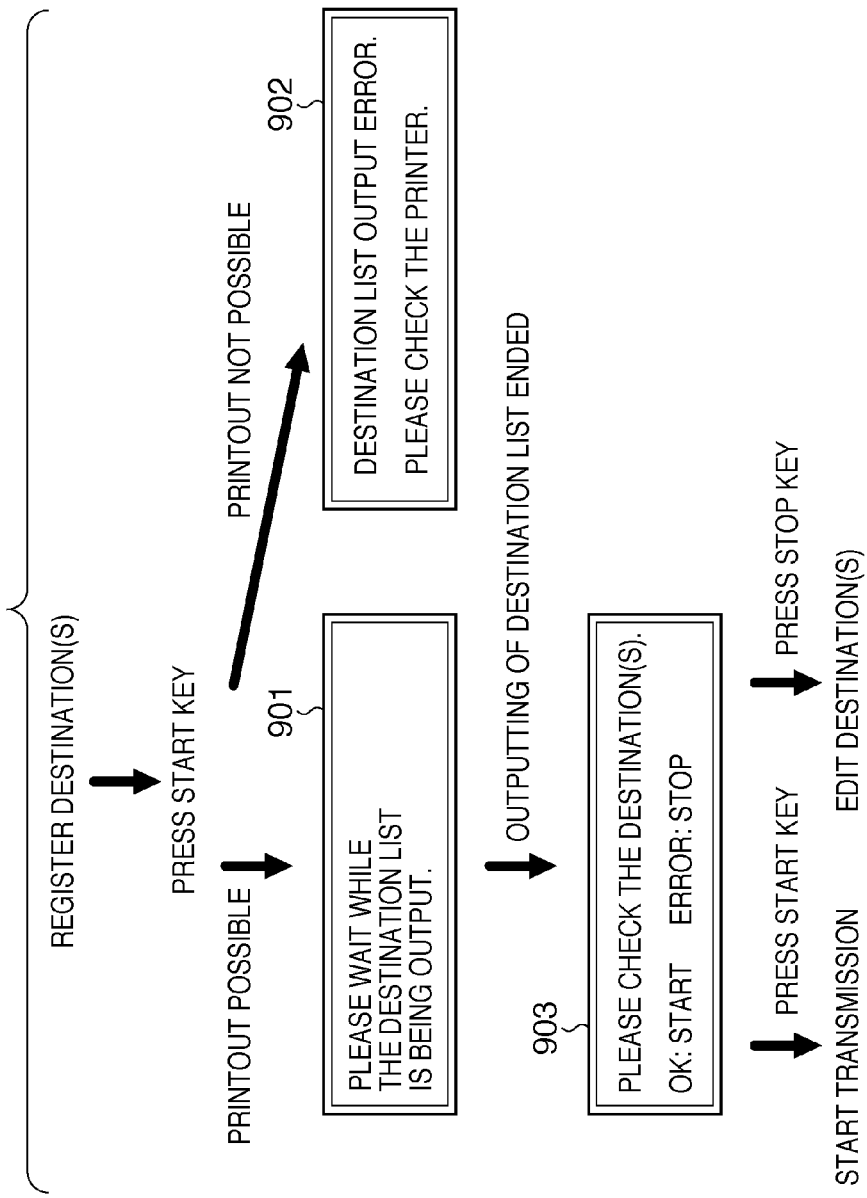

FIG. 10A

```
************************
       DESTINATION LIST
************************

1011
1. MMMMMMMM
2. NNNNNNNNN
3. aaa@bbb.ccc.dd
         ⋮
```

DATA COMMUNICATION APPARATUS, CONTROL METHOD THEREOF, COMPUTER PROGRAM AND STORAGE MEDIUM

BACKGROUND OF THE INVENTION

1. Field of the Invention

The present invention relates to a data communication apparatus that transmits data, a control method thereof, a computer program and a storage medium.

2. Description of the Related Art

A data communication apparatus has a function of transmitting data to another party, using a facsimile machine or email, for example. A data communication apparatus such as this has a function of broadcasting to a plurality of destinations designated at one time. For example, Japanese Patent Laid-Open No. H08-023409 proposes a facsimile communication system that collectively executes email transmission and fax broadcasting of transmission original information read by a fax machine.

However, if a destination is erroneously designated in a data communication apparatus such as this, confidential information may get sent to an unintended party. The chances of the operator erroneously designating destinations increase, particularly, in the case where broadcasting is performed to a plurality of destinations designated at one time. Further, the operator may have difficulty confirming the destinations due to a restriction on the number of characters that can be displayed on a display apparatus provided in the data communication apparatus. This results in an increased incidence of erroneous transmission.

SUMMARY OF THE INVENTION

The present invention was made in consideration of the foregoing problems, and enables realization of a data communication apparatus that reduces erroneous transmission, together with allowing an operator to readily confirm destinations registered as data transmission destinations, a control method thereof, a computer program and a storage medium.

One aspect of the present invention provides a data communication apparatus for transmitting data and provided with an operation unit adapted to receive an operation from an operator, comprising: a destination registering unit adapted to register at least one or more destinations; a data acquisition unit adapted to acquire data to transmit to the registered destinations; a destination list print unit adapted to print a destination list showing the registered destinations to allow the operator to confirm the registered destinations; an operation acquisition unit adapted to acquire, via the operation unit, a first operation operated by the operator if the destinations shown on the destination list are confirmed by the operator; and a transmission unit adapted to transmit, if the first operation is acquired, the acquired data to the destinations shown on the destination list.

Another aspect of the present invention provides a control method of a data communication apparatus for transmitting data and provided with an operation unit adapted to receive an operation from an operator, comprising the steps of: registering at least one or more destinations; acquiring data to transmit to the registered destinations; printing a destination list showing the registered destinations to allow the operator to confirm the registered destinations; acquiring, via the operation unit, a first operation operated by the operator if the destinations shown on the destination list are confirmed by the operator; and transmitting, if the first operation is acquired, the acquired data to the destinations shown on the destination list.

Still another aspect of the present invention provides a computer program for causing a computer to execute a control method of a data communication apparatus for transmitting data and provided with an operation unit adapted to receive an operation from an operator, the computer program comprising the steps of: registering at least one or more destinations; acquiring data to transmit to the registered destinations; printing a destination list showing the registered destinations to allow the operator to confirm the registered destinations; acquiring, via the operation unit, a first operation operated by the operator if the destinations shown on the destination list are confirmed by the operator; and transmitting, if the first operation is acquired, the acquired data to the destinations shown on the destination list.

Further features of the present invention will be apparent from the following description of exemplary embodiments with reference to the attached drawings.

BRIEF DESCRIPTION OF THE DRAWINGS

FIGS. 7A and 7B are flowcharts representing a variation of the data transmission process according to the third embodiment.

FIG. 8 is a flowchart representing processing by a printer 105 according to a fourth embodiment.

FIGS. 9A to 9C show exemplary displays on a display screen in the present invention.

FIGS. 10A to 10D show exemplary outputs of a destination list in the present invention.

DESCRIPTION OF THE EMBODIMENTS

Preferred embodiments of the present invention will now be described in detail with reference to the drawings. It should be noted that the relative arrangement of the components, the numerical expressions and the numerical values set forth in these embodiments do not limit the scope of the present invention unless it is specifically stated otherwise.

First Embodiment

Figure 1:
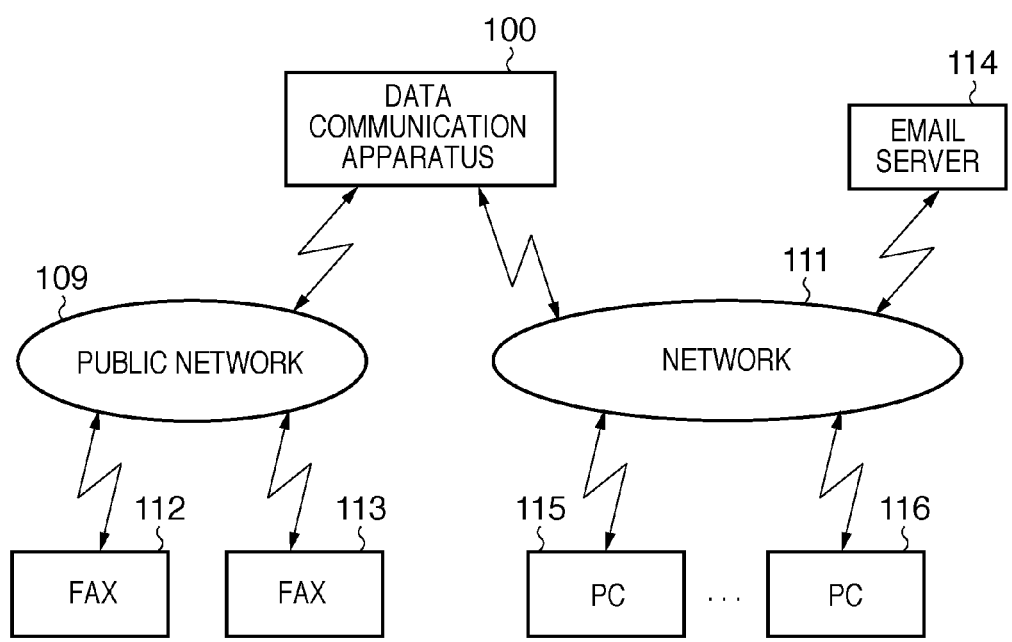
FIG. 1 shows an overall system that includes a data communication apparatus 100 according to an embodiment.

Hereinafter, a first embodiment will be described with reference to FIGS. 1 to 4. FIG. 1 shows an overall system that includes a data communication apparatus 100 according to the present embodiment.

The system according to the present embodiment is constituted to include the data communication apparatus 100, an email server 114, fax machines 112 and 113, personal computers (PCs) 115 and 116, a public network 109, and a network 111. The data communication apparatus 100 communicates by fax with the fax machines 112 and 113 via the public network 109, and communicates by email with the email server 114 via the network 111. The PCs 115 and 116 constituting the parties with which email communication is performed are able to receive email addressed thereto from the email server 114 via the network 111. Further, the data communication apparatus 100 can broadcast the same image data to a plurality of destinations, including with fax and email transmission.

Figure 2:
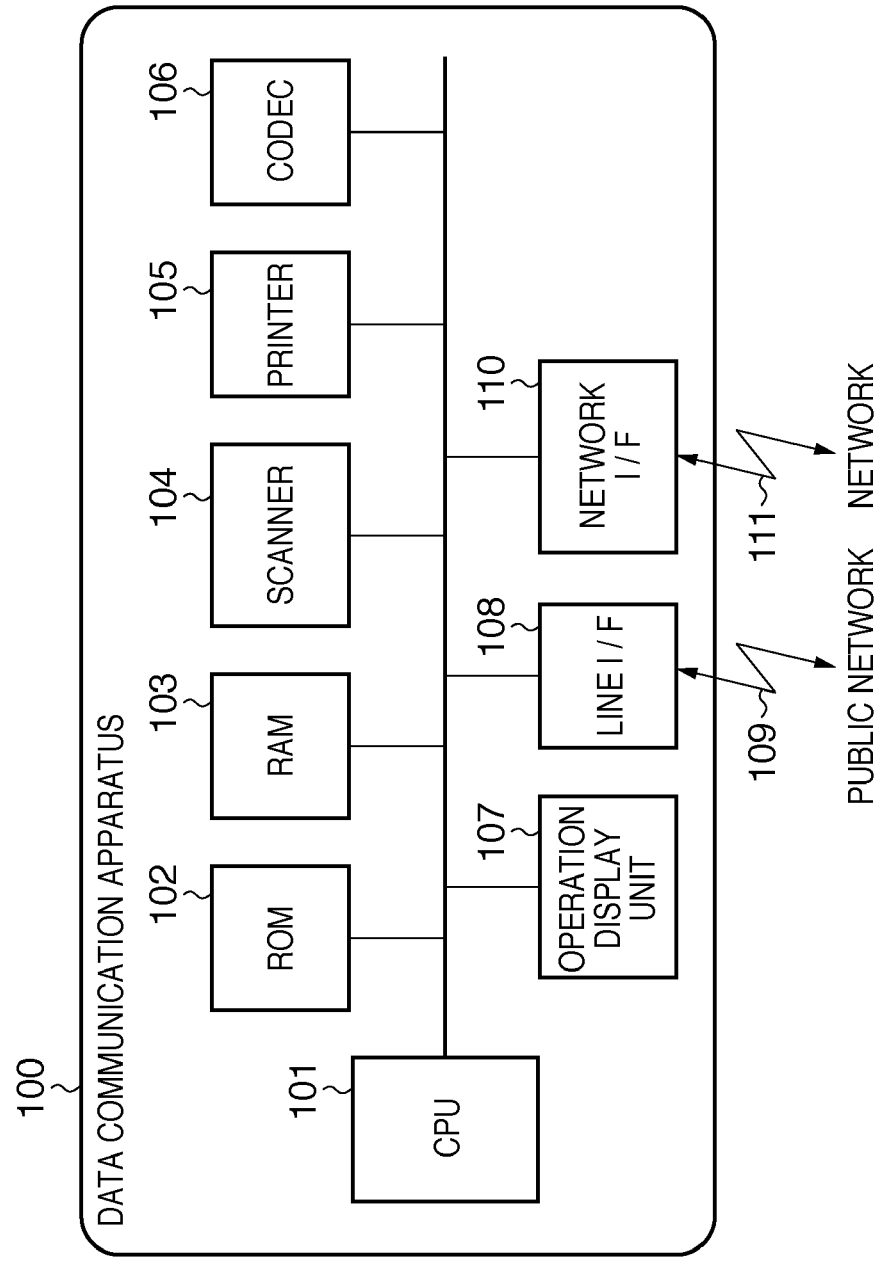
FIG. 2 shows an overall configuration of the data communication apparatus 100 according to the embodiment.

Next, an exemplary configuration of the data communication apparatus 100 will be described with reference to FIG. 2. FIG. 2 shows an overall configuration of the data communication apparatus 100 according to the present embodiment.

The data communication apparatus 100 is provided with a CPU 101, a ROM 102, a RAM 103, a scanner 104, a printer 105, a CODEC 106, an operation display unit 107, a line interface (I/F) 108, and a network interface (I/F) 110. Note that the line I/F 108 is connected to the public network 109, while the network I/F 110 is connected to the network 111.

The CPU 101 is a system control unit that controls the overall data communication apparatus 100. The ROM 102 stores a control program of the CPU 101. Note that the control program is a computer program for causing a computer to execute processing (described below) according to the present embodiment. The RAM 103 is constituted by a SRAM, DRAM or the like, and stores execution programs, control variables and the like. Settings, management data and the like registered by the operator of the data communication apparatus 100 as well as various work buffers are stored in the RAM 103.

The scanner 104, which is constituted by a CS image sensor, an original conveying mechanism and the like, optically reads an original and converts the read original to electrical image data. The printer 105 is an apparatus that prints an image onto printing material based on a received image or file data.

The CODEC 106 is a module that performs encoding, such as JBIG or JPEG, and decoding, and a processing unit that executes compression and expansion on image data that conforms to a prescribed standard. The operation display unit 107, which is constituted by a keyboard, a touch panel, an LCD, an LED or the like, receives various operations from the operator and displays notifications to the operator.

The line I/F 108, which is constituted by a modem (modulation/demodulation unit), a NCU (network control unit) and the like, sends and receives faxes via the public network 109. The network I/F 110 sends and receives email and the like via the network 111.

Figure 3:
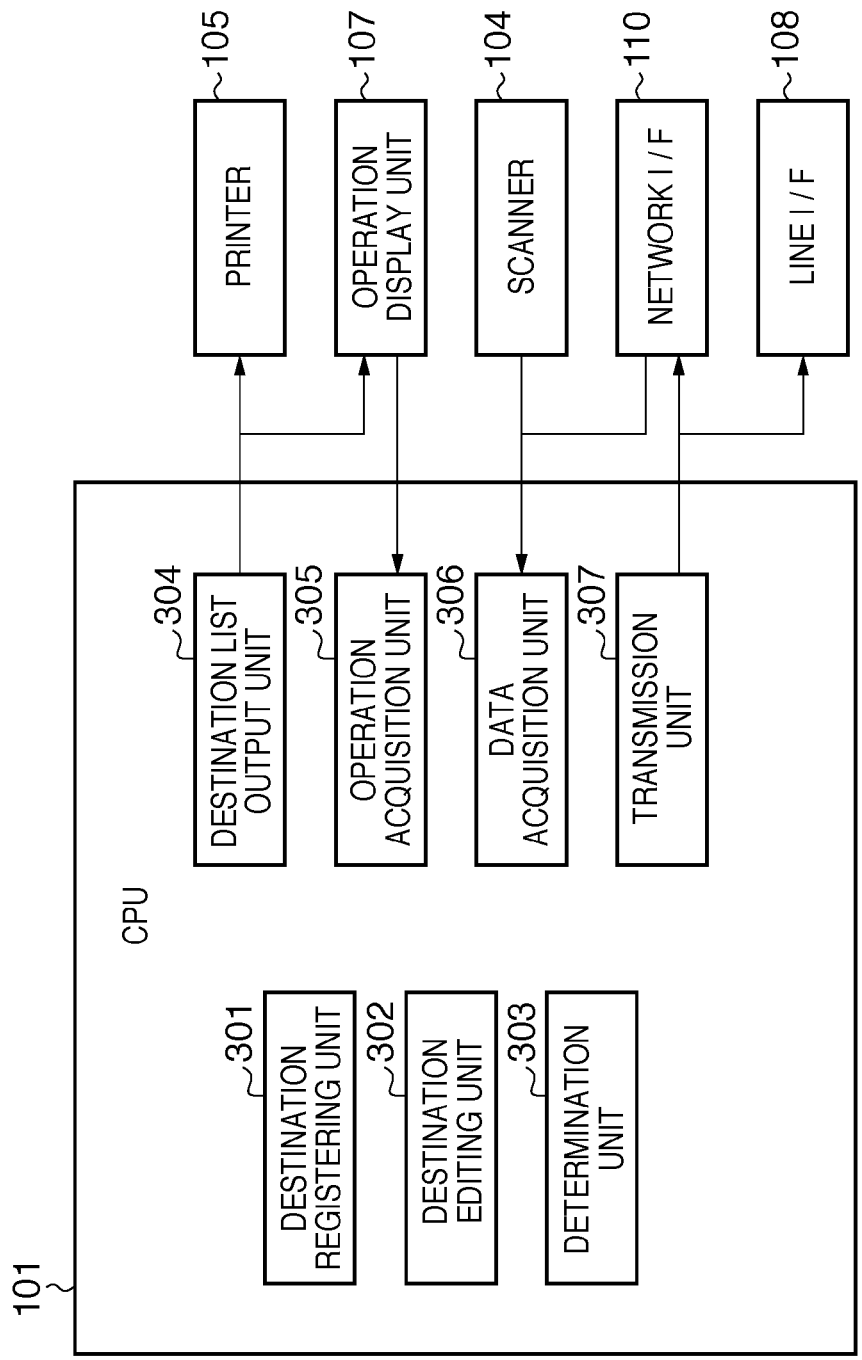
FIG. 3 shows functional blocks of a CPU 101 according to a first embodiment.

Next, the controls of the CPU 101 according to the present embodiment will be described with reference to FIG. 3. FIG. 3 shows the functional blocks of the CPU 101 according to the first embodiment. Here, only the functional blocks that relate mainly to the present invention will be described. However, the CPU 101 according to the present embodiment may be constituted to include other functional blocks.

The CPU 101 is provided with a destination registering unit 301, a destination editing unit 302, a determination unit 303, a destination list output unit (destination list print unit) 304, an operation acquisition unit 305, a data acquisition unit 306, and a transmission unit 307. The processing of these functional blocks may be stored as a computer program in the ROM 102. In this case, the CPU 101 reads out the program from the ROM 102, and executes the processing described below.

The destination registering unit 301 registers at least one or more pieces of destination information as data transmission destinations, out of destination information directly entered by the operator using a soft keyboard displayed on the operation display unit 107, and destination information managed in an address book stored in the RAM 103. Further, the destination registering unit 301 notifies the registered destinations to the destination list output unit 304 and the transmission unit 307 (described below).

The destination editing unit 302 corrects destinations registered by the operator of the data communication apparatus 100. The destination editing unit 302 acquires an operation by the operator via the operation display unit 107, and edits destinations on a destination list. Further, the destination editing unit 302 notifies edited destinations to the destination list output unit 304 and the transmission unit 307.

Once one or more destinations have been registered by the operator, the determination unit 303 determines whether output of a destination list showing the destinations registered by the destination registering unit 301 is possible. Here, "output" includes at least one of display on the operation display unit 107 and printing onto printing material by the printer 105. In the case of printing the destination list, for example, the determination unit 303 determines whether printing of the destination list is executable in the printer 105. If determined that output of the destination list is not possible, the determination unit 303 performs an error display on the operation display unit 107. Here, the destination registering unit 301 may perform a control to prohibit data transmission, if it is determined by the determination unit 303 that output of the destination list is not possible. On the other hand, the destination registering unit 301 permits data transmission if it is determined that output of the destination list is possible.

The destination list output unit 304 outputs the destination list showing the registered destinations to allow the operator to confirm the destinations registered by the destination registering unit 301. As described above, the destination list output unit 304 outputs the destination list using at least one of the printer 105 and the operation display unit 107. The destination list output unit 304 may be configured, in the case where the destination list is edited, to output the edited destination list again. The destination list output unit 304 may also be configured, when the number of registered destinations is less than a predetermined number, to cause the operation display unit 107 to display the destination list. That is, the destination list may be displayed if the number of destinations is displayable with the operation display unit 107, and printed if the number of destinations is not displayable. Here, while the number of destinations displayable by the operation display unit 107 may differ for each data communication apparatus, it preferably is set to a number that allows the operator to readily check the destinations.

The operation acquisition unit 305 acquires an operation by the operator via the operation display unit 107. For example, the operation acquisition unit 305 acquires an operation (first operation) operated by the operator in the case where the destinations shown on the destination list are confirmed by the operator. The operation acquisition unit 305 acquires an operation (second operation) operated by the operator in the case where destinations on the destination list need correction.

The data acquisition unit 306 acquires data to transmit to the registered destinations. Specifically, the data acquisition unit 306 reads an image on the original from the scanner 104, and generates image data to transmit. The data acquisition unit 306 may also be configured to acquire data to transmit from a computer connected via the network 111. Note that acquired data is temporarily stored in the RAM 103.

The transmission unit 307 transmits the acquired data to the destinations shown on the destination list. Specifically, the transmission unit 307 transmits the data stored in the RAM 103, if the first operation is acquired. That is, the data communication apparatus 100 of the present embodiment performs data transmission on condition that the first operation is acquired. The transmission unit 307 transmits data by fax transmission or email transmission via the network I/F 110 or the line I/F 108.

Figure 4:
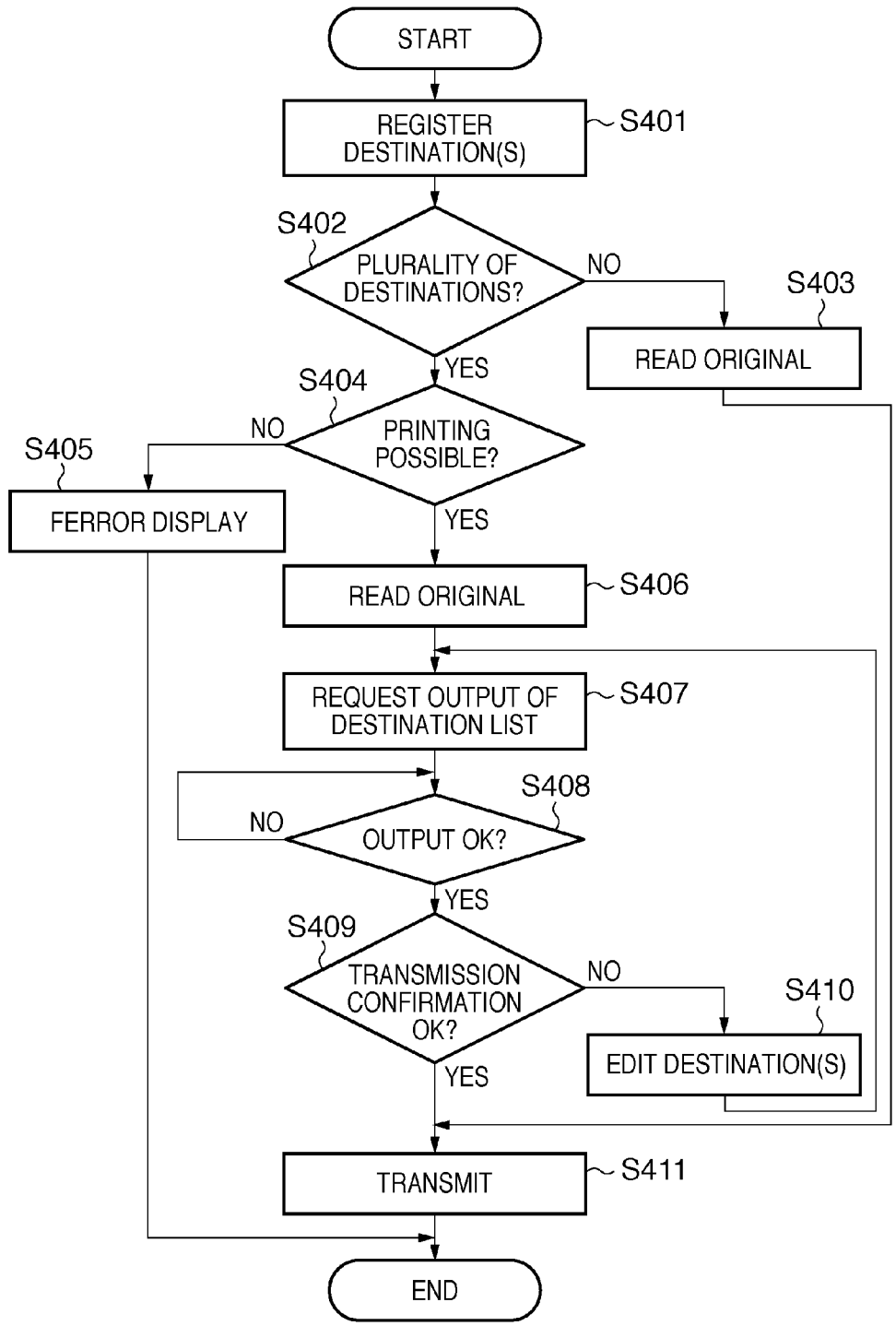
FIG. 4 is a flowchart representing a data transmission process according to the first embodiment.

FIG. 4 is a flowchart representing a data transmission process according to the first embodiment. The overall processing described hereinafter is controlled by the CPU 101. Here, a method in which a destination list is printed onto printing material by the printer 105 is described as an example.

In step S401, the destination registering unit 301 registers one or more data transmission destinations in accordance with an instruction from the operator. Once one or more destinations have been registered, the CPU 101, in step S402, determines whether a plurality of destinations is registered. If determined in step S402 that a plurality of destinations is not registered, the data acquisition unit 306, in step S403, acquires image data to transmit by causing the scanner 104 to read an image on the original, and shifts the processing to step S411. On the other hand, if, in step S402, there is a plurality of registered destinations, the CPU 101 shifts the processing to step S404.

In step S404, the determination unit 303 determines whether output of the destination list by the printer 105 is possible. Specifically, the determination unit 303 checks whether printing material for outputting the destination list is set in the printer 105. Further, the determination unit 303 checks whether an error such as a paper jam has occurred in the printer 105. If determined that output of the destination list is not possible, the CPU 101, in step S405, performs a display on the operation display unit 107 indicating that the destination list cannot be output, and ends the processing.

On the other hand, if determined that output of the destination list is possible, the data acquisition unit 306, in step S406, acquires image data to transmit by causing the scanner 104 to read an image on the original. Subsequently, in step S407, the CPU 101 requests the destination list output unit 304 to output the destination list. Further, in step S408, the CPU 101 puts the process on standby until the destination list is output normally.

In step S409, the CPU 101 determines whether a first operation input by the operator in the case where the output destination list is confirmed as being correct has been acquired by the operation acquisition unit 305. That is, the data communication apparatus 100 of the present embodiment allows the operator to check whether there are any errors in the destinations shown on the output destination list, and to input the first operation using the operation display unit 107 if there are no errors. On the other hand, if an error exists, the data communication apparatus 100 allows the operator to input a second operation indicating that the destinations on the destination list need correction. Here, if the second operation is acquired, the destination editing unit 302, in step S410, edits the destinations on the destination list in accordance with editing content instructed by the operator via the operation display unit 107. Once the destinations on the destination list have been edited, the CPU 101 shifts the processing to step S407, and again causes the destination list showing the edited destinations to be output.

On the other hand, if the first operation is acquired, the transmission unit 307, in step S411, performs image data transmission to the destinations on the destination list, and ends the processing. Specifically, the transmission unit 307 transmits the data collectively to all of the destinations registered in the destination list.

As described above, the data communication apparatus according to the present embodiment outputs a destination list containing information on transmission destinations registered as destinations to allow the operator to confirm the destinations. The data communication apparatus performs data transmission on the condition that the destinations are confirmed as being correct by the operator. The data communication apparatus is thereby able to suppress data transmission to incorrect transmission destinations.

Note that the present invention is not limited to the foregoing embodiment, with various modifications being applicable. For example, the data communication apparatus may be configured to form the destination list on printing material. The data communication apparatus is thereby able to allow the operator to readily confirm registered destinations, even in the case where a plurality of destination are registered for broadcasting.

Second Embodiment

Next, a second embodiment will be described with reference to FIG. 5. The present embodiment acquires data to transmit, after the destinations shown on a destination list have been confirmed by the operator. The data communication apparatus 100 thereby improves memory efficiency during data transmission.

Figure 5:
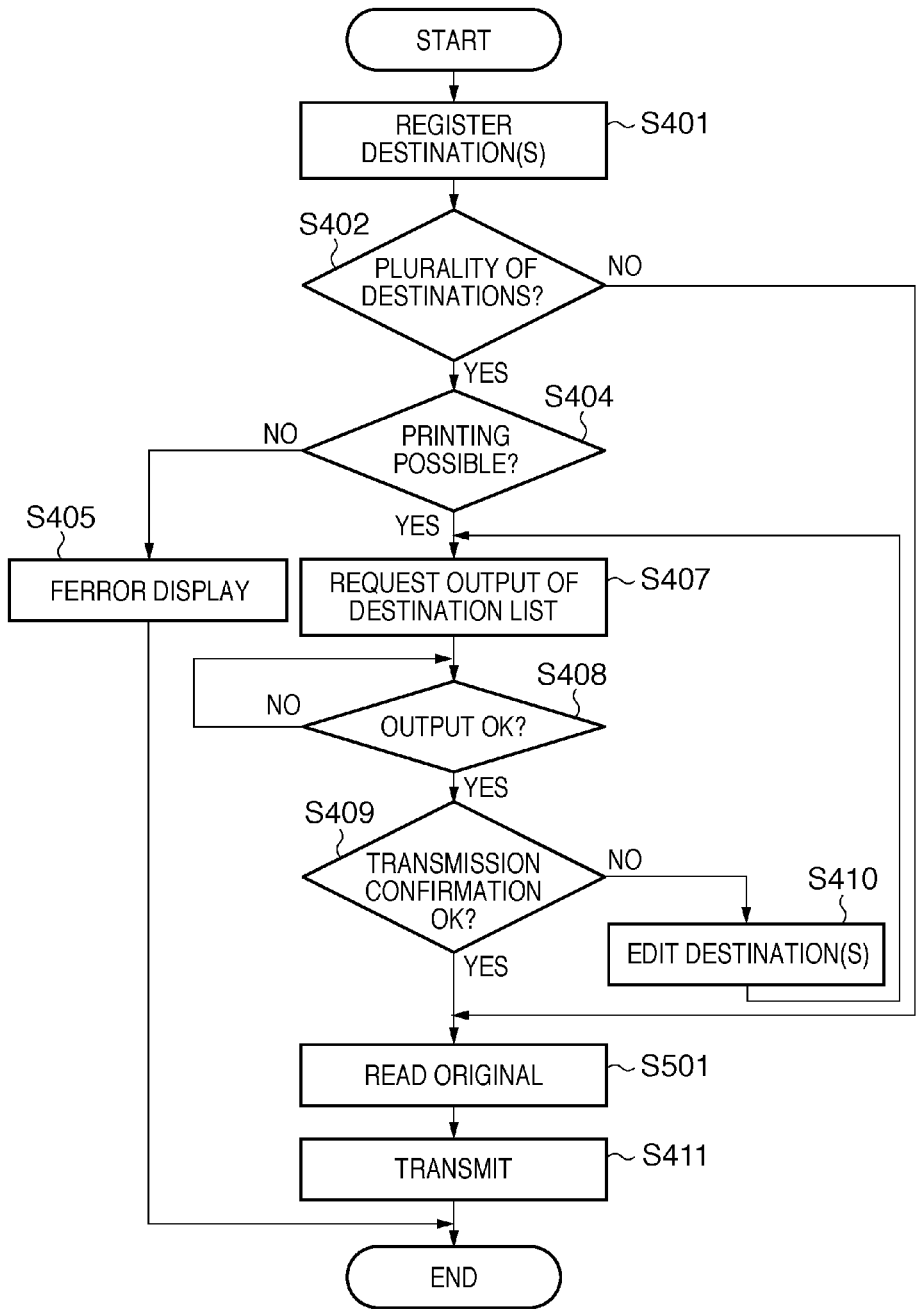
FIG. 5 is a flowchart representing a data transmission process according to a second embodiment.

FIG. 5 is a flowchart representing a data transmission process according to the second embodiment. The overall processing described hereinafter is controlled by the CPU 101. Here, only the processing that differs from the processing shown in FIG. 4 will be described. That is, only the processing of step S501 will be described. Note that the same reference numerals as FIG. 4 are attached to redundant processing, and description thereof will be omitted.

As shown in FIG. 5, the processing of step S501 is performed in the transmission process according to the present embodiment, instead of the processing of steps S403 and S406 shown in FIG. 4. Specifically, in step S501, the data acquisition unit 306 acquires data to transmit, after the above-described first operation has been acquired. That is, the data acquisition unit 306 acquires data to transmit, after the registered destinations have been confirmed as correct by the operator, and stores the acquired data in the RAM 103.

As described above, the data communication apparatus 100 according to the present embodiment does not store image data in memory until the operator confirms that there are no errors in the registered destinations. Consequently, the data communication apparatus 100 is able to suppress the capacity of storage memory, enabling memory efficiency to be improved.

Third Embodiment

Next, a third embodiment will be described with reference to FIGS. 6A to 7B. The present embodiment executes other processing while the destinations are being confirmed by the operator, allowing operating efficiency to be improved.

Figure 6A:
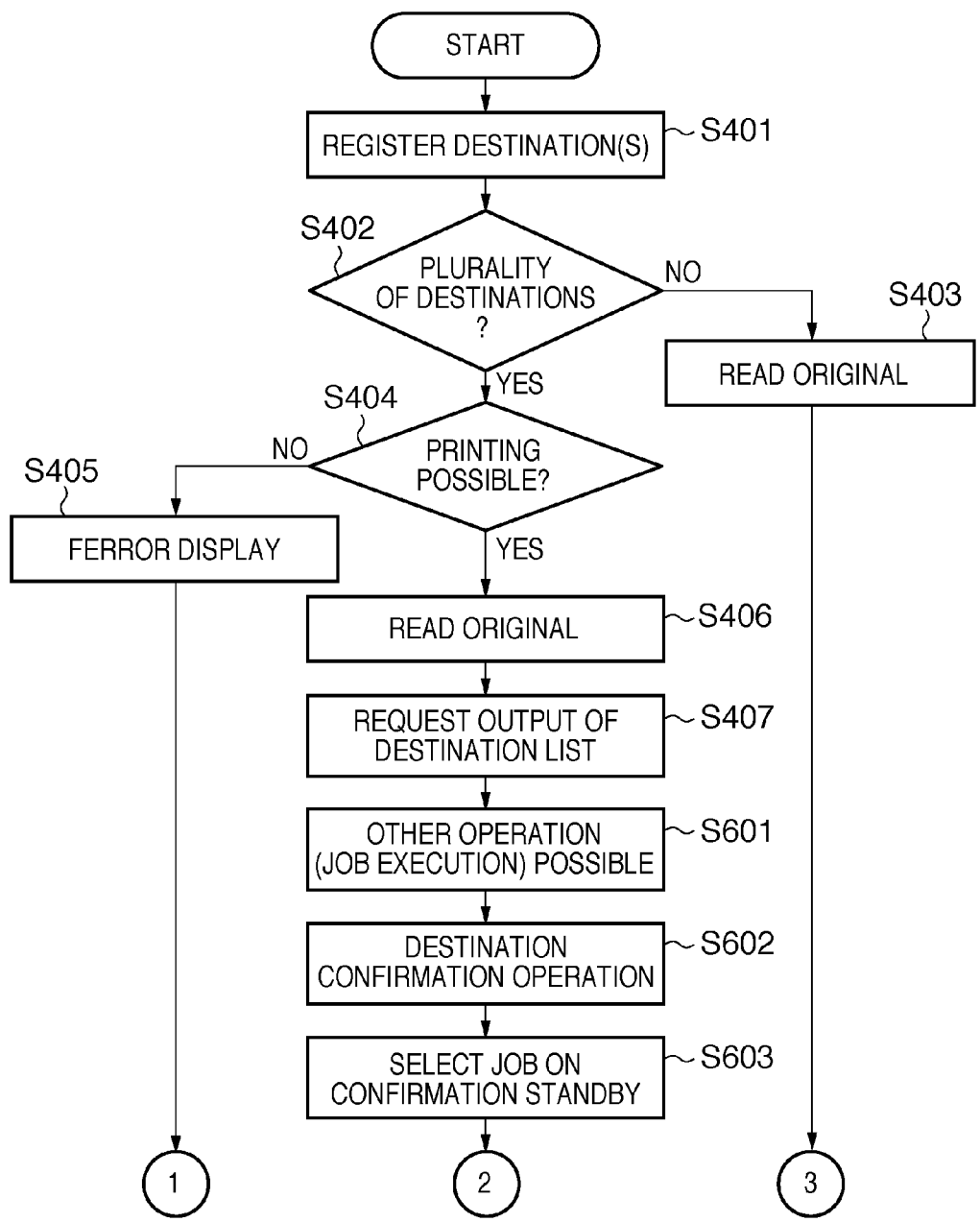
FIGS. 6A and 6B are flowcharts representing a data transmission process according to a third embodiment.
Figure 6B:
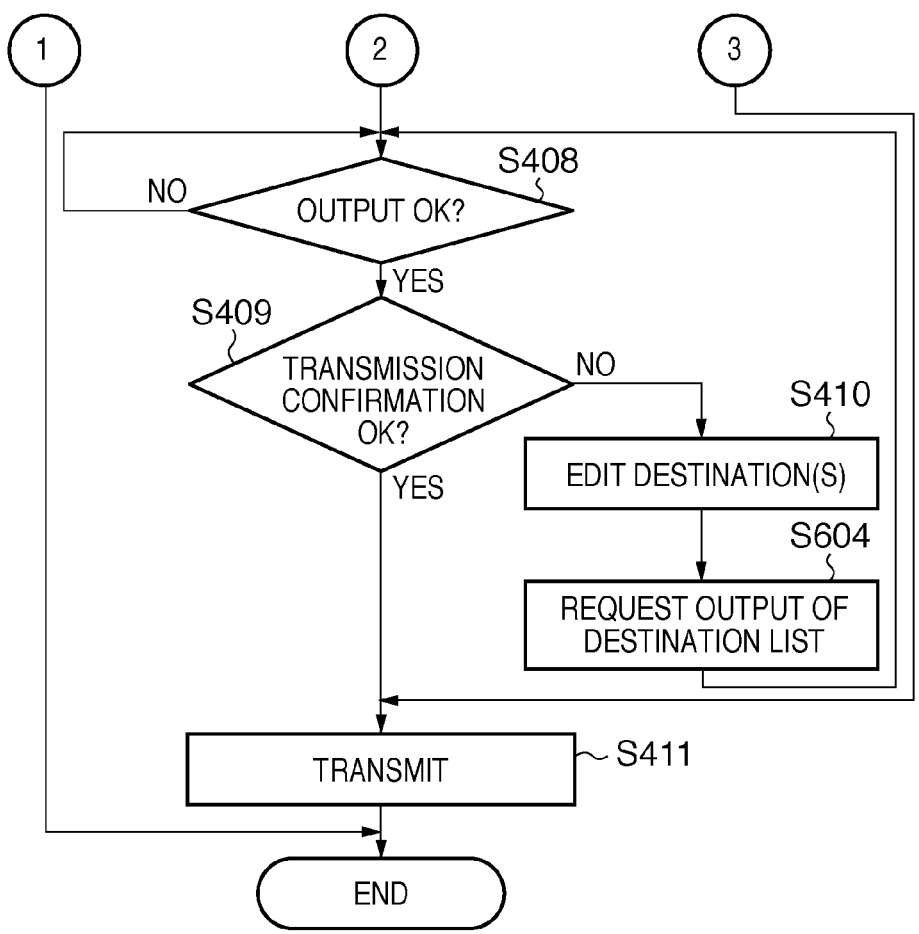

FIGS. 6A and 6B are flowcharts representing a data transmission process according to the third embodiment. The overall processing described hereinafter is controlled by the CPU 101. Here, only the processing that differs from the processing shown in FIG. 4 will be described. That is, only the processing of steps S601 to S604 will be described. Note that the same reference numerals as FIG. 4 are attached to redundant processing, and description thereof will be omitted.

In step S601, the CPU 101 executes another transmission job (another operation) that is different from the transmission job for transmitting data to the destinations registered at S401 (i.e., transmission job currently being executed). Here, the CPU 101 functions as an execution unit. This processing is performed between the destination list being output at S407 and a destination confirmation operation (first or second operation) being acquired at S602. Subsequently, in step S602, the operation acquisition unit 305 acquires the first or second operation operated by the operator, and ends execution of the other job. Further, in step S603, the CPU 101 selects and executes the transmission job that was on standby. Here, the selection of a transmission job involves, for example, specifying a transmission job to target by allowing the operator to enter the receipt number of a job included on the destination list.

Then, the CPU 101 executes the processing of steps S408 and S409 in order, similarly to FIG. 4. Here, if the operation by the operator acquired at S602 is the second operation, the CPU 101 shifts the processing to S410. Once the destinations have been edited at S410, the destination list output unit 304 again outputs the edited destination list at S604. On the other hand, if the first operation is acquired at S602, the CPU 101 shifts the processing to S411 after S409, and causes the data to be transmitted to the registered destinations.

As described above, the data communication apparatus 100 according to the present embodiment executes other processing after outputting the destination list, until a destination confirmation operation is performed by the operator. That is, the data communication apparatus 100 is able to execute other processing during transmission standby. Therefore, the data communication apparatus 100 can improve operating efficiency during data transmission process.

Figure 7B:
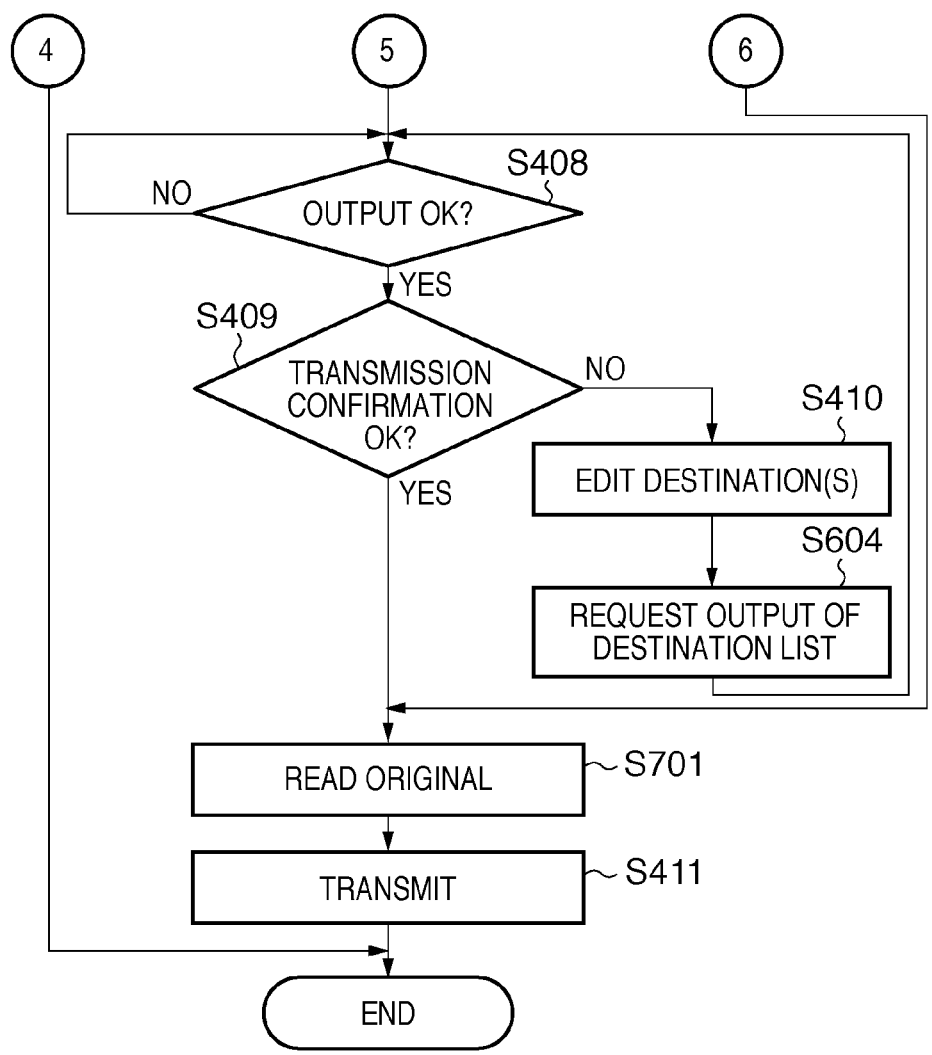

The present embodiment can also be realized in combination with the second embodiment. FIGS. 7A and 7B are flowcharts representing a variation of the data transmission process according to the third embodiment.

As shown in FIGS. 7A and 7B, the data acquisition unit 306, in step S701, may be configured to acquire transmission data from the original after the destinations have been confirmed, similarly to the flowchart of FIG. 5. The data communication apparatus 100 is thereby able to improve memory efficiency as well as operating efficiency in the data transmission process.

Fourth Embodiment

Next, a fourth embodiment will be described with reference to FIG. 8. Here, processing in the case where the printer 105 is in use when outputting the destination list will be described. The printer 105 according to the present embodiment suspends the printing process constituting the other print job (image forming job) when a request to output the destination list is received, and prints the destination list.

FIG. 8 is a flowchart representing processing by the printer 105 according to the fourth embodiment. The overall processing described hereinafter is controlled by a control unit of the printer 105.

In step S801, the printer 105 receives a destination list output request from the CPU 101. Once the destination list output request has been received, the printer 105, in step S802, determines whether there exists a job currently being printed. Here, if a job currently being printed does not exist, the printer 105, in step S806, prints the destination list.

On the other hand, if determined at S802 that a job currently being printed does exist, the printer 105, in step S803, suspends the job being printed. Subsequently, in step S804, the printer 105 prints the destination list. Then, once the destination list has been printed, the printer 105, in step S805, restarts the job suspended at S803.

Thus, if there is a job being printed, the printer 105 according to the present embodiment suspends the job being printed and preferentially prints the destination list. Therefore, the printer 105 is able to perform the data transmission process efficiently by preferentially printing the destination list, even if a large print job is being executed.

Other Embodiments

Next, other embodiments will be described with reference to FIGS. 9A to 10D. Here, exemplary displays on a display screen will be described with reference to FIGS. 9A to 9C, while exemplary outputs of a destination list will be described with reference to FIGS. 10A to 10D.

Figure 9B:
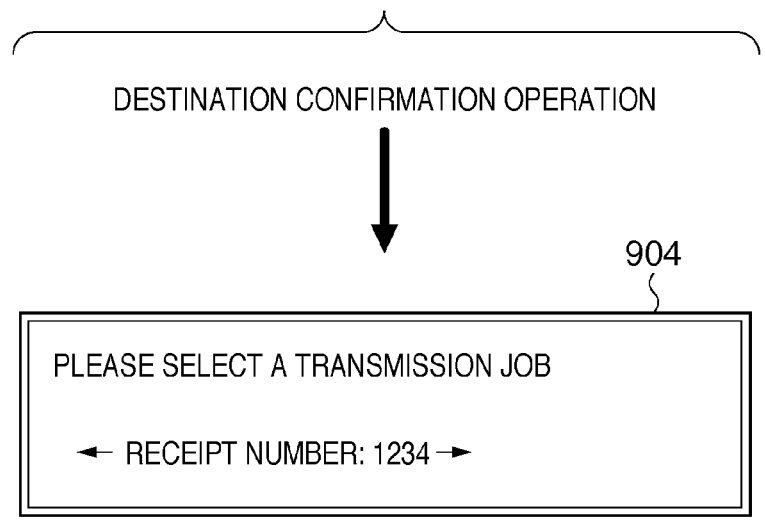
Figure 9C:
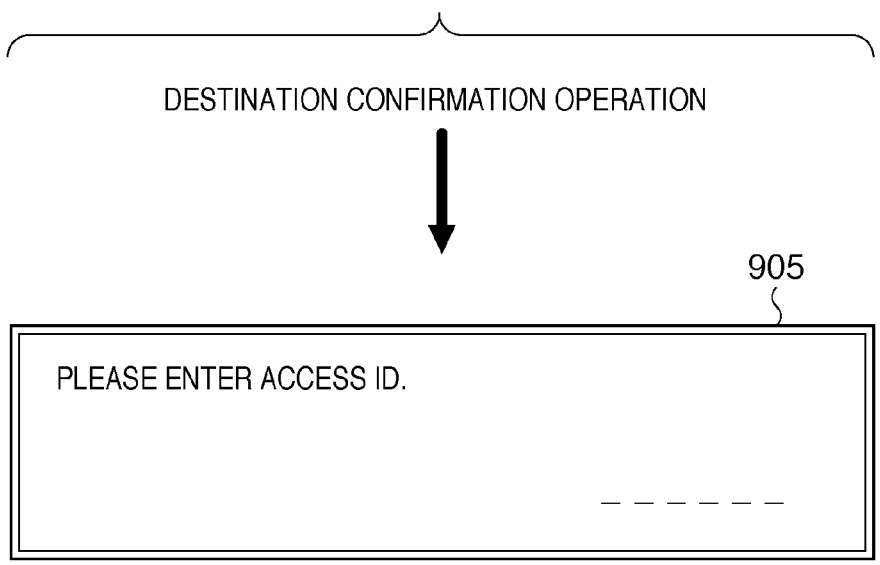
Figure 10B:
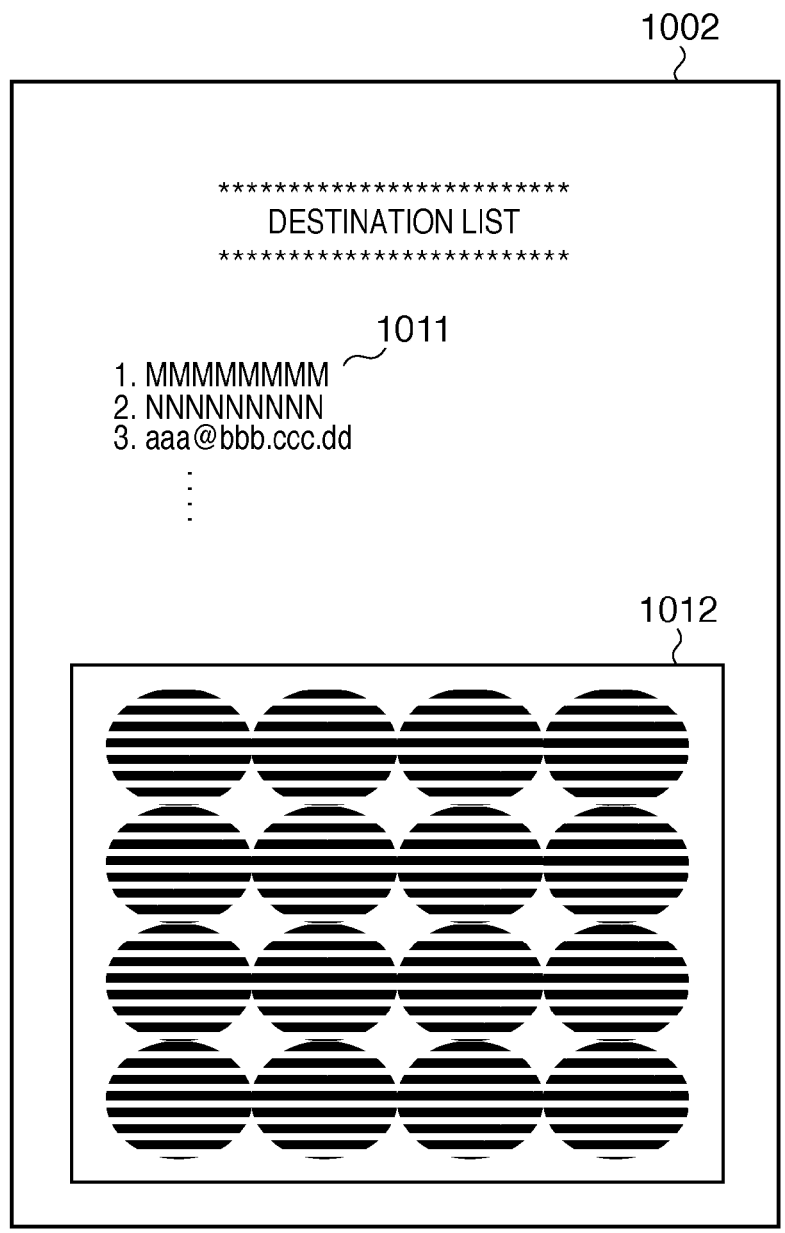
Figure 10C:
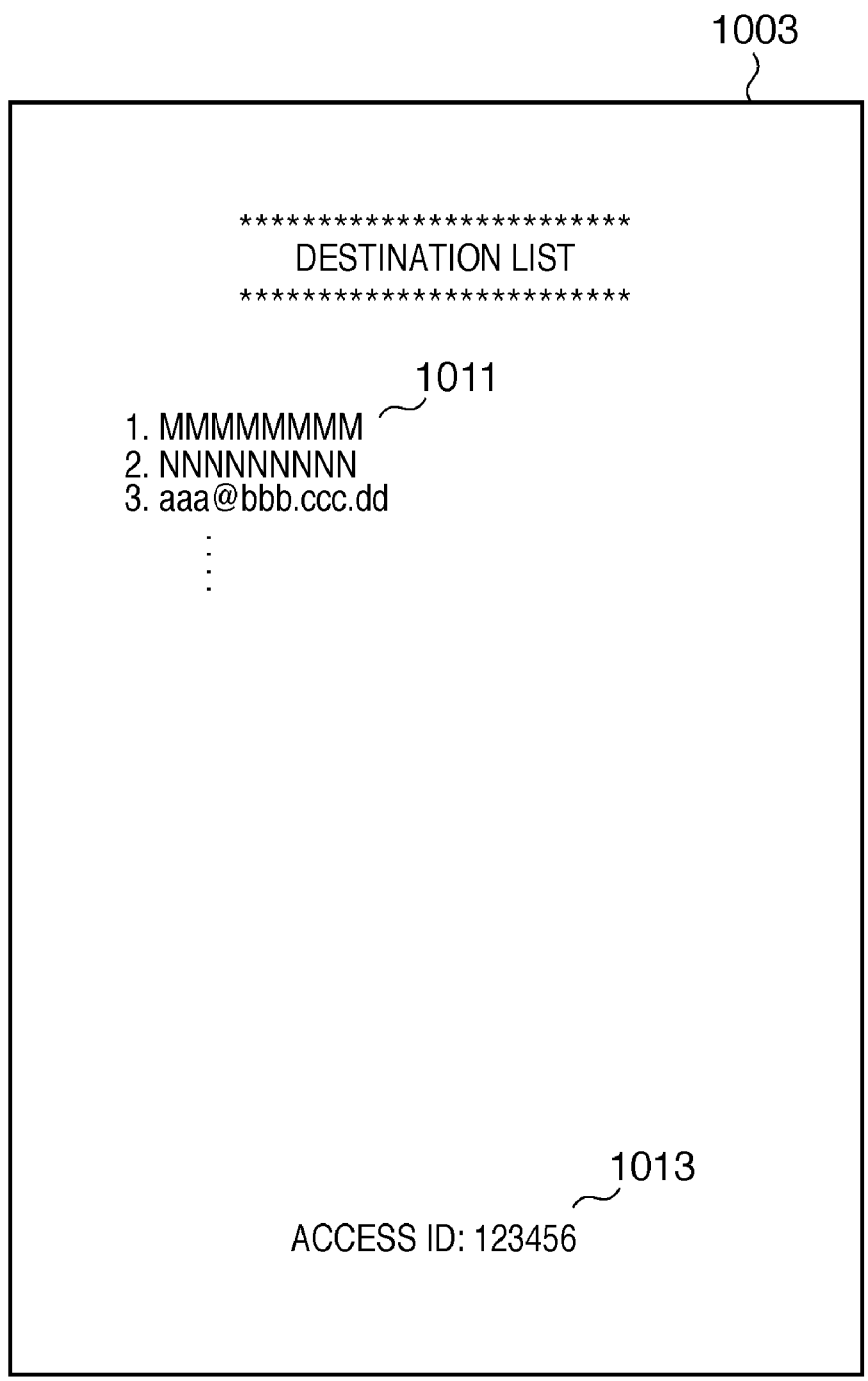
Figure 10D:
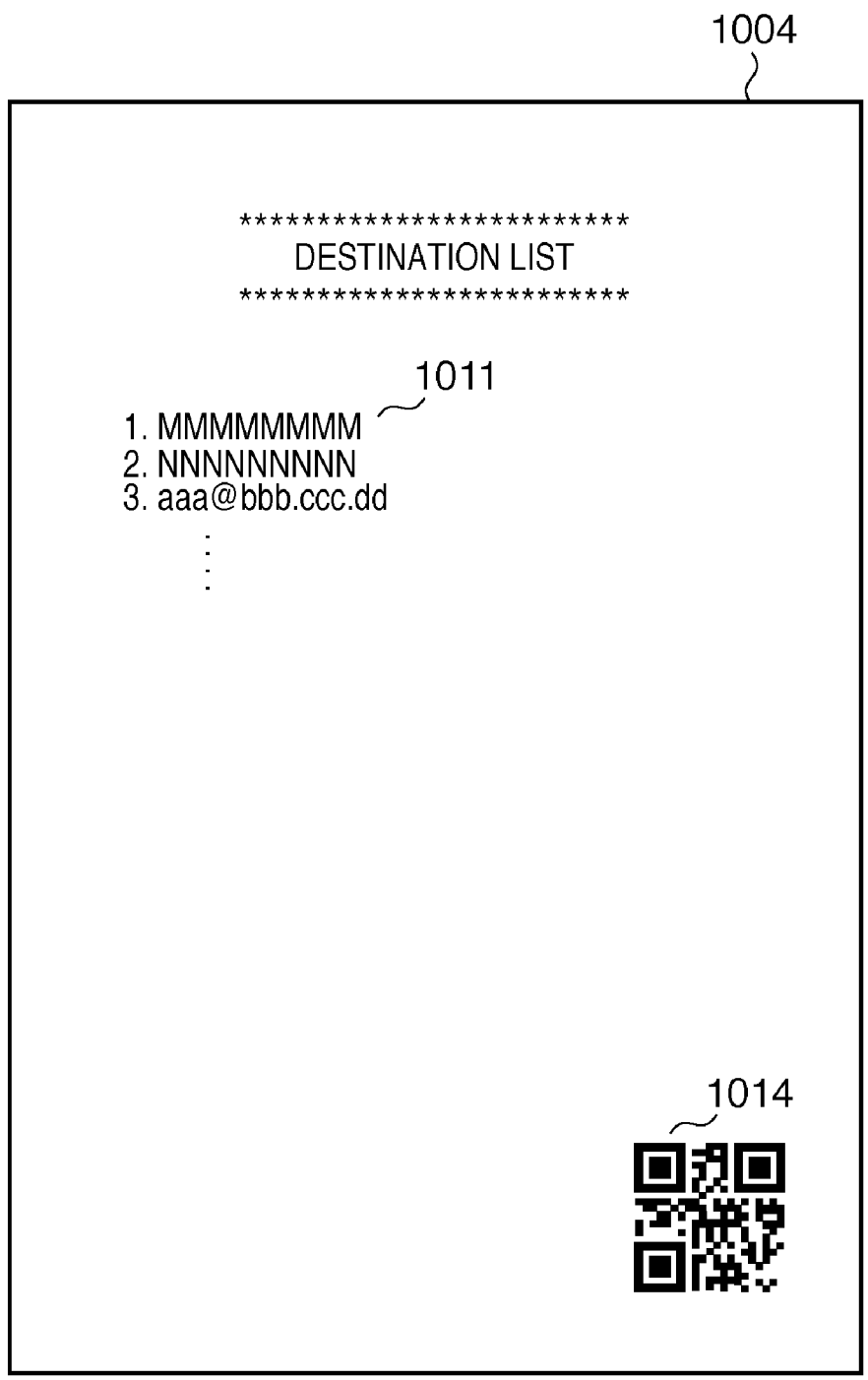

FIGS. 9A to 9C each show exemplary displays on a display screen in the present invention. Here, exemplary displays, displayed to the operator, on the operation display unit 107 corresponding to the above processes are shown.

FIG. 9A shows the transition in the display screen from destination registration to destination confirmation. A display screen 901 is an exemplary display displayed during the output of a destination list in S407, for example. In other words, the display screen 901 is displayed at the point that the operator presses the Start key after registering destinations. A display screen 902 is displayed in order to inform the operator of an error in S405, for example. A display screen 903 is displayed in order to request the operator to confirm the destinations, after output of the destination list has been confirmed in S408, for example. Here, the operator selects OK or error on the display screen 903 after checking the output destination list, and presses the corresponding key. For example, the Start key is pressed if OK, while the Stop key is pressed if there is an error. The operation display unit 107 may be constituted by a touch panel. In this case, the operator is able to directly press OK or Error on the display screen.

FIGS. 9B and 9C show display screens when selecting a transmission job whose destinations are to be confirmed. Display screens 904 and 905 are exemplary displays displayed when selecting a transmission job whose destinations are to be confirmed at S603. With the display screen 904, a transmission job for confirmation is designated by allowing the operator to select a receipt number. With the display screen 905, a transmission job for confirmation is designated by allowing the operator to enter an access ID output on the destination list.

FIGS. 10A to 10D show exemplary outputs of a destination list in the present invention. Here, FIGS. 10A to 10D show different exemplary outputs of a destination list.

With a destination list 1001, a case is shown as an example in which destinations 1011 such as the fax numbers or email addresses of transmission destinations are output as a list. With a destination list 1002, a case is shown as an example in which an image 1012 formed using the transmission data is output in addition to the destinations 1011. With a destination list 1003, a case is shown as an example in which an access ID (character string) 1013 for identifying the transmission job is output in addition to the destinations 1011. The transmission job is specified by entering this access ID 1013 on the display screen 905. A receipt number may be output instead of the access ID 1013. With a destination list 1004, a case is shown as an example in which a two-dimensional barcode 1014 for identifying the transmission job is output in addition to the destinations 1011. The transmission job is specified by reading and analyzing this two-dimensional barcode 1014. The present invention is not limited to only the foregoing exemplary outputs, with a configuration that combines the foregoing exemplary destination list outputs being possible.

While various embodiments have been detailed above, the present invention may be applied to a system constituted by a plurality of devices or an apparatus composed of a single device, examples of which include a printer, a facsimile, a PC, or a computer system that includes a server and a client.

The present invention is also achieved by directly or remotely supplying a computer program that realizes the functions of the foregoing embodiments to a system or an apparatus, and reading out and executing the supplied program code with a computer of the system or apparatus.

Consequently, the present invention is also realized by the actual program code installed on the computer, in order to realize the functions and processes of the present invention by computer. That is, the actual computer program for realizing the above functions and processes is also covered by the present invention.

In this case, the program may be executed in any form, such as an object code, a program run by an interpreter, or script data supplied to an operating system, provided the functions of a program are present.

Examples of computer-readable storage media for supplying the program include flexible disk, hard disk, optical disk, magneto-optical disk, MO, CD-ROM, CD-R, and CD-RW. Other storage media that can be used include magnetic tape, nonvolatile memory card, ROM, and DVD (DVD-ROM, DVD-R).

The program may also be downloaded from a website on the Internet using the browser of a client computer. That is, the actual computer program of the present invention or a compressed file including an auto-install function may be downloaded from the website to a storage medium such as a hard disk. The present invention can also be realized by dividing the program code constituting the program into a plurality of files and downloading the respective files from different websites. That is, a World Wide Web (WWW) server that allows a plurality of users to download program files for realizing the functions and processes of the present invention by computer may also be a constituent feature of the present invention.

The program of the present invention may also be distributed to users in encrypted form stored on a storage medium such as a CD-ROM. In this case, users that satisfy a prescribed criterion are allowed to download decryption key information from a website via the Internet, and decrypt and execute the encrypted program with the key information to install the program on a computer.

The functions of the foregoing embodiments may also be realized as a result of a computer executing the read program. Note that an operating system or the like running on a computer can perform part or all of the actual processing based on instructions in the program. This also, of course, enables the functions of the foregoing embodiments to be realized.

Further, the program read out from the storage medium may also be written to a memory provided in a function expansion board inserted into a computer or a function expansion unit connected to a computer, and a CPU or the like provided in the function expansion board or the function expansion unit may perform part or all of the actual processing based on instructions in the program. The functions of the foregoing embodiments are also thereby realized.

The present invention is able to provide a data communication apparatus that reduces erroneous transmission, together with allowing an operator to readily confirm destinations registered as data transmission destinations, for example, a control method thereof, a computer program and a storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-214045, filed Aug. 20, 2007, which is hereby incorporated by reference herein in its entirety.

What is claimed is:

1. A data communication apparatus that transmits data, the apparatus comprising:
   an operation unit configured to receive an operation from an operator;
   a destination registering unit configured to register one or more destinations, wherein the one or more destination addresses include one or more fax numbers or email addresses;
   a data acquisition unit configured to acquire data to be transmitted to the one or more registered destinations;
   a destination list print unit configured to print a destination list including the one or more registered destinations to enable the operator to confirm the one or more registered destinations;
   a display unit configured to display the destination list;
   an operation acquisition unit configured to acquire, via the operation unit, a first operation indicating that the one or more registered destinations included in the destination list are confirmed by the operator;
   a transmission unit configured to transmit, when the first operation is acquired, the acquired data to the one or more registered destinations included in the destination list; and
   a determination unit configured to determine whether printing of the destination list is possible,
   wherein the destination registering unit enables data transmission by the transmission unit when the determination unit determines that printing of the destination list is possible, and disables data transmission by the transmission unit when the determination unit determines that printing of the destination list is not possible,
   wherein the display unit displays the destination list to enable the operator to confirm the one or more registered destinations when a number of the one or more registered destinations is less than a predetermined number, and
   wherein the destination list print unit prints the destination list to enable the operator to confirm the one or more registered destinations when the number of the one or more registered destinations is greater than or equal to the predetermined number and the determination unit determines that printing of the destination list is possible.

2. The data communication apparatus according to claim 1, wherein the operation acquisition unit acquires, instead of the first operation, a second operation, when the one or more registered destinations included in the destination list are to be corrected,
   wherein the data communication apparatus further comprises a destination editing unit configured to edit, when the second operation is acquired, the one or more registered destinations included in the destination list in accordance with an operation by the operator, and
   wherein the destination list print unit prints, when the one or more registered destinations included in the destination list are edited, another destination list including the one or more edited destinations.

3. The data communication apparatus according to claim 2, further comprising an execution unit configured to execute, between the destination list being printed or displayed and the first or second operation being acquired, another transmission job that is different from a transmission job for transmitting the acquired data to the one or more registered destinations included in the destination list.

4. The data communication apparatus according to claim 1, wherein the data acquisition unit acquires the data to be transmitted, after the first operation is acquired.

5. The data communication apparatus according to claim 1, wherein the destination list print unit gives a print job including the destination list priority over other print jobs.

6. The data communication apparatus according to claim 1, wherein the destination list print unit prints the data to be transmitted, together with the destination list.

7. The data communication apparatus according to claim 1, wherein the destination list print unit prints information for identifying the data to be transmitted together with the destination list.

8. The data communication apparatus according to claim 7, wherein the information for identifying the data to be transmitted is at least one of a receipt number, a character string, and a two-dimensional barcode.

9. A control method performed by a data communication apparatus that transmits data, the method comprising:
   registering one or more destinations, wherein the one or more destination addresses include one or more fax numbers or email addresses;
   acquiring data to be transmitted to the one or more registered destinations;
   displaying the destination list to enable the operator to confirm the one or more registered destinations when a number of the one or more registered destinations is less than a predetermined number;
   determining whether printing of the destination list is possible, wherein data transmission is enabled when a determination is made that printing of the destination list is possible, and data transmission is disabled when a determination is made that printing of the destination list is not possible;
   printing the destination list to enable the operator to confirm the one or more registered destinations when the number of the one or more registered destinations is greater than or equal to the predetermined number and the determination is made that printing of the destination list is possible;
   acquiring, via an operation unit, a first operation indicating that the one or more registered destinations included in the destination list are confirmed by an operator; and
   transmitting, when the first operation is acquired and data transmission is enabled, the acquired data to the one or more registered destinations included in the destination list.

10. A non-transitory computer-readable storage medium storing a computer-executable program that, when executed by a computer, causes the computer to perform a control method of a data communication apparatus that transmits data, the method comprising:
    registering one or more destinations, wherein the one or more destination addresses include one or more fax numbers or email addresses;
    acquiring data to be transmitted to the one or more registered destinations;
    displaying the destination list to enable the operator to confirm the one or more registered destinations when a number of the one or more registered destinations is less than a predetermined number;
    determining whether printing of the destination list is possible, wherein data transmission is enabled when a determination is made that printing of the destination list is possible, and data transmission is disabled when a determination is made that printing of the destination list is not possible;
    printing the destination list to enable the operator to confirm the one or more registered destinations when the number of the one or more registered destinations is greater than or equal to the predetermined number and the determination is made that printing of the destination list is possible;
    acquiring, via an operation unit, a first operation indicating that the one or more registered destinations included in the destination list are confirmed by an operator; and
    transmitting, when the first operation is acquired and data transmission is enabled, the acquired data to the one or more registered destinations included in the destination list.

* * * * *